United States Patent [19]

Cerna et al.

[11] Patent Number: 5,444,707
[45] Date of Patent: Aug. 22, 1995

[54] PACKET SWITCHING COMMUNICATION SYSTEM

[75] Inventors: Pavel Cerna, Westminster; Robert E. Hay, Boulder, both of Colo.

[73] Assignee: Netrix Telcom Systems Corporation, Boulder, Colo.

[21] Appl. No.: 90,439

[22] Filed: Jul. 9, 1993

Related U.S. Application Data

[63] Continuation of Ser. No. 650,565, Feb. 1, 1991, abandoned.

[51] Int. Cl.⁶ .................................................. H04J 3/18
[52] U.S. Cl. ............................ 370/94.1; 370/118; 375/240
[58] Field of Search ............... 370/94.1, 60, 118, 109, 370/95.3, 95.1; 379/84, 225; 375/122; 395/200

[56] References Cited

U.S. PATENT DOCUMENTS

| Re. 31,182 | 3/1983 | Crager et al. | 370/60 |
|---|---|---|---|
| 4,100,377 | 7/1978 | Flanagan | 370/81 |
| 4,453,247 | 6/1984 | Suzuki et al. | 370/60 |
| 4,589,110 | 5/1986 | Eng et al. | 370/118 |
| 4,677,616 | 6/1987 | Franklin | 370/94.1 |
| 4,679,189 | 7/1987 | Olson et al. | 370/60 |
| 4,730,348 | 3/1988 | MacCrisken | 375/122 |
| 4,771,425 | 9/1988 | Baran et al. | 370/94.1 |
| 4,782,485 | 11/1988 | Gollub | 370/60 |
| 4,876,681 | 10/1989 | Hagiwara et al. | 370/94.1 |
| 4,905,233 | 2/1990 | Cain et al. | 370/94.1 |
| 4,922,486 | 5/1990 | Lidinsky et al. | 370/94.1 |
| 4,984,235 | 1/1991 | Hillis et al. | 370/94.1 |
| 5,008,882 | 4/1991 | Peterson et al. | 370/94.3 |
| 5,021,949 | 6/1991 | Morten et al. | 370/60 |
| 5,140,417 | 8/1992 | Tanaka et al. | 370/85.6 |
| 5,235,595 | 8/1993 | O'Dowd | 370/60 |
| 5,282,207 | 1/1994 | Jurkevich et al. | 370/110.1 |

OTHER PUBLICATIONS

"Multiple User Variable Rate Coding for TASI and Packet Transmission Systems" by Cox & Crochiere; IEEE Transactions on Communications, vol. COM-28, No. 3; Mar. 1980; pp. 334-343.

"Experience with Speech Communication in Packet Networks" by Weinstein & Forgie; Journal on Selected Areas in Communications, vol. SAC-1, No. 6; Dec. 1983; pp. 963-980.

*Primary Examiner*—Douglas W. Olms
*Assistant Examiner*—Dang Ton
*Attorney, Agent, or Firm*—Dorsey & Whitney

[57] ABSTRACT

A multi-channel telephonic communications system, where voice, data, and facsimile information is packetized and switched to the desired destination based upon a call number embedded in each packet which is based upon the digits dialed at the source. A switching architecture is used to minimize the trunk line resource needed and to simplify system configuration and maintenance. Connection between the source and the desired destination are allowed if there is sufficient bandwidth to support the connection. Flow control is also provided, which dynamically varies the bandwidth used by voice packets to adjust to changing traffic levels. Voice bandwidth is reduce when needed by the traffic volume, and voice bandwidth is increased when possible to improve voice quality.

10 Claims, 7 Drawing Sheets

PACKET SWITCHING COMMUNICATION SYSTEM

This is a continuation of application Ser. No. 07/650,565 filed Feb. 1, 1991, now abandoned.

TECHNICAL FIELD

The present invention pertains generally to the field of multi-channel telephonic communications. In particular, it pertains to a communications system which switches packetized information from a source node to a desired destination node based upon the digits dialed, which have been embedded in each of the packets in the form of a unique call number.

BACKGROUND ART

Telephonic communication between remotely located offices of a single organization is traditionally accomplished through use of public phone lines or by leasing private lines. For occasional communication traffic, public telephone lines are quite adequate. As the volume of traffic increases, it may become economically advantageous to lease private lines. While reducing the cost compared to the public lines, the leasing of private lines remains quite expensive. In an attempt to further reduce the cost, techniques have been developed for multiplexing multiple channels of communication across a reduced number of communication lines. These techniques are well known in the art, and include synchronous time-division multiplexing (TDM) as well as information packetizing.

Multiplexers performing these techniques are placed at opposite ends of a communication path, increasing the amount of communication traffic a particular line can handle, thus reducing the cost per communication event. A large organization may have several offices scattered nationally or even globally. A private communication system meeting the needs of such an organization would typically provide one or more multiplexers at each location, leased trunk lines to interconnect the locations to each other, and a local PBX system at each location to interface internal telephones to the public phone system and the leased trunk lines.

The difficulty with this approach is that multiplexers are point to point devices, in that they are intended to be connected at the two nodes (or end points) of a single communication path. Interconnection of more than two nodes requires trunk lines to interconnect every pair of nodes, and that the multiplexers at each node be capable of handling multiple trunk lines. As the complexity of this type of system increases through the addition of nodes, the number of trunk lines required for interconnection of all pairs of nodes increases exponentially, with a corresponding exponential increase in cost.

At some point, the complexity of the system carries with it a cost which is prohibitive, and in an attempt to reduce cost, some of the contemplated trunk lines are eliminated. Communications between a pair of nodes not directly connected by a trunk line are accomplished by routing through an alternate node which is connected to both nodes in the pair between which communication is to take place. The PBX at the alternate node receives the traffic from the originating node, and routes it back through its multiplexer to another trunk line and on to the destination node.

While routing in this manner reduces the number of interconnecting trunk lines required and the associated cost, other problems and limitations are introduced. For example, if the multiplexers use a digital packetizing scheme including speech compression, then routing through multiple PBX systems would likely involve tandem encoding. Tandem encoding occurs when an analog signal is packetized and compressed to digital at the source node, decompressed and restored to analog at the intermediate node's PBX, re-packetized and re-compressed to digital, and decompressed and restored again to analog at the destination PBX. Each generation of compression and decompression introduces distortion into the resulting analog signal, and more than two generations is likely to result in distortion sufficient to render the communication unintelligible. This means that the system must provide a number of trunk lines sufficient to allow every node to communicate with every other node with no more than one intermediate routing through a PBX. This requirement limits the ability of the organization to reduce cost through the elimination of trunk lines.

In addition, traffic routing requires that each node have sufficient trunk resource not only for its own communication, but also for that of the traffic it must pass on to other nodes. Determining the amount of trunk line resource necessary for any given node thus becomes a rather complex process, in that it depends upon traffic that the node will have no direct involvement with. Further complicating the problem is the fact that each node has multiple trunk lines, each corresponding to a given remote node, and that the multiplexer to trunk line connections are "nailed up", meaning that the PBX and multiplexer use the trunk line corresponding to the desired destination node. The result of this architecture is that the traffic on each trunk line depends upon the node to node routing paths, as well as the volume of traffic being handled by that node.

The previous discussion presumes the use of multiplexers with "nailed up" PBX connections and no direct connections for passing through-traffic. However, even if the multiplexers being used support networking (i.e., pass the through-traffic without PBX tandem encoding), the connections through which the through-traffic is routed are static and at best can be altered based upon the time of day or other statistical parameters. This tends to mitigate the problems associated with "nailed up" connections, but does not eliminate them. The amount of trunk line resource needed at a node still depends upon traffic the node is not involved in and upon the routing paths being used.

These problems associated with communication routing systems of the prior art are exacerbated as the complexity of the system increases. The addition of more nodes either increases the number of trunk lines required or makes routing more complicated, or both. The more complex the routing patterns, the more dependant a node is on other node's resources, and the more difficult it is to determine the amount of resource needed for any given trunk line at each node. Increased complexity also increases the administrative burden involved in managing the line resources and the equipment involved.

It is clear that there is a need for a communication system which makes optimum use of trunk line resource, while having an architecture that minimizes trunk line expense and that allows for expansion without undue complexity or expense.

SUMMARY OF THE INVENTION

The present invention is directed toward a packet switching communications system capable of conveying voice, facsimile (FAX) and data between nodes. The system operates by packetizing and compressing the information (voice, FAX, or data) and embedding a header within each packet containing a unique call number based upon the digits dialed at the source location. By including this routing information (the call number) with the voice, FAX or computer data being sent, a packetizing and compressing system can use a switching architecture rather than a routing architecture, thus making optimal use of the digital circuits required to interconnect the various nodes. This architecture eliminates the "nailed up" and static connection problem, in effect being able to alter the connections on a call-by-call basis.

Operation begins when a telephone number is dialed at a source node, and the RLX at the source node sends a request to the packet switching unit for a connection. The packet switching unit reads the digits dialed at the source node and determines whether there is sufficient bandwidth for communication over the requested connection to occur. If there is sufficient bandwidth, then the packet switching unit requests a connection to the desired destination node. If accepted, then the connection is complete and communication between the nodes can begin.

The packet switching unit consists of a master board and one or more slave boards, connected together over a common internal bus. Each slave board connects to as many as four RLX devices, each located at one of the various nodes of the system.

Packetized data arrives from one RLX to a slave board, the header is read to determine its destination, and the packet is switched to the desired destination RLX as indicated by the call number. The packet is then switched onto a trunk line associated with the desired destination node.

Accordingly, it is an object of the present invention to provide a communication system which makes optimal use digital trunk lines which interconnect the various communication nodes of the system.

Another object of the present invention is to provide a communication system which uses packetized information, and switches packets from the source node to the desired destination node.

These and other objectives of the present invention will become apparent with reference to the drawings, the detailed description of the preferred embodiment, and the appended claims.

DETAILED DESCRIPTION OF THE PREFERRED EMBODIMENT

The assignee of the present invention is also the assignee of U.S. Pat. No. 4,782,485, which is addressed to digital packetizing techniques, and the disclosure of which is hereby incorporated by reference.

Figure 1:
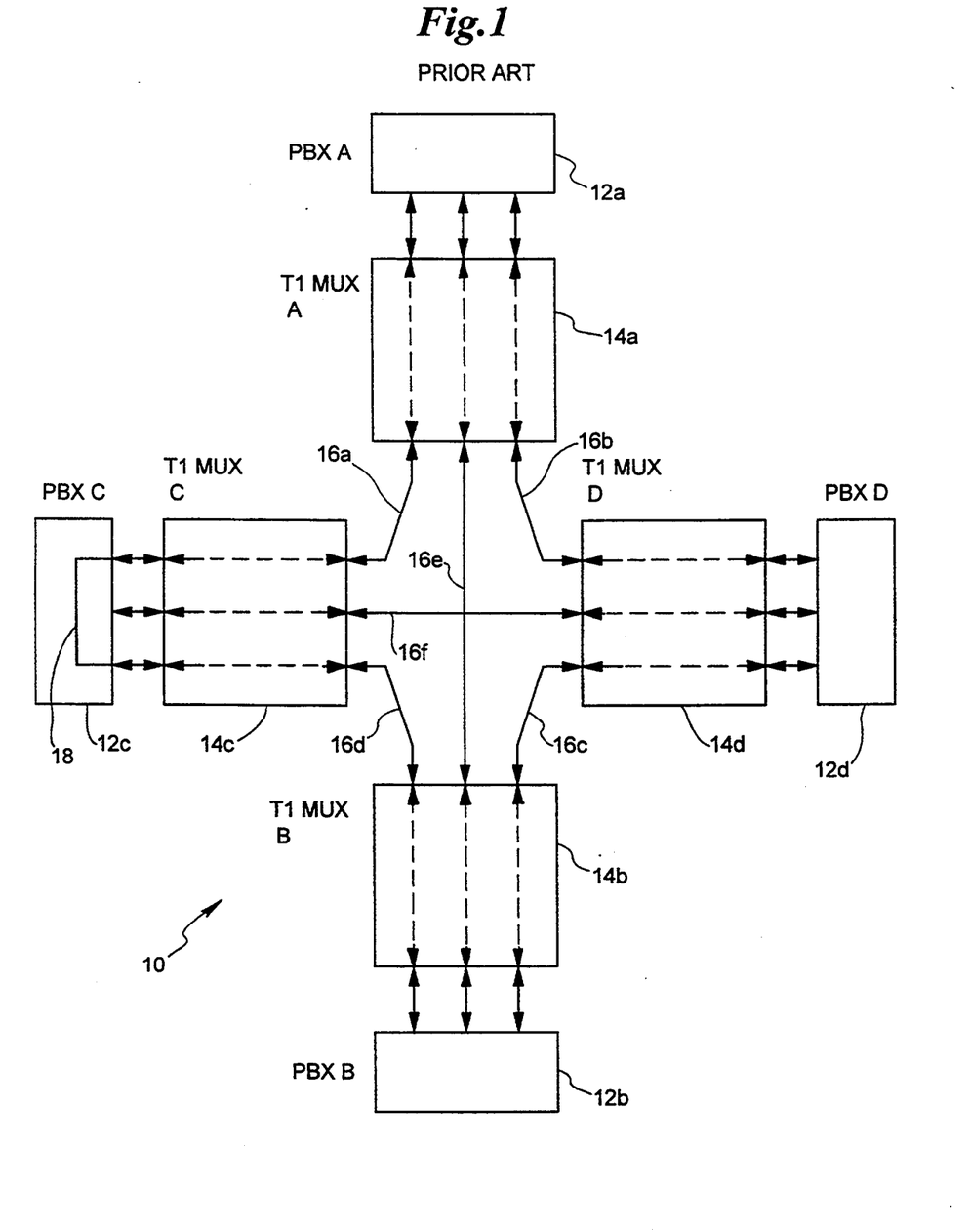
FIG. 1 shows a multiple node communications system architecture according to the prior art.

Referring to FIG. 1, a block diagram of a prior art telecommunication system 10 is shown. Each location or node within the system has a PBX 12 and a T1 multiplexer 14 for interfacing to T1 trunk lines, and which connects to a set of trunk lines 16 interconnecting the various locations. For example, trunk line 16a connects multiplexers 14a and 14c, trunk line 16b connects multiplexers 14a and 14d, etc. To fully interconnect all four locations, six trunk lines 16a–16f are required. In the shown example, fully interconnecting four locations requires six trunk lines. As the number of locations to be interconnected increases, the required number of trunk lines increases exponentially. In order to fully interconnect all locations, the required number of trunk lines is:

$$(n^2-n)/2$$

where 'n' is the number of locations to be interconnected.

Each multiplexer 14 may be a single device capable of handling all the trunk lines 16 connected to the node in question, or may be multiple devices, each handling one or more of the trunk lines 16. Either way, there must be sufficient multiplexing equipment 14 at each location to interface to each of the trunk lines 16 connected to that location. The same holds true for the PBX equipment at each location. Since the multiplexer connections are "nailed up", the PBX must be capable of connecting to as many trunks as are connected to the location. The costs associated with the PBX and multiplexing equipment at each location, and the corresponding maintenance costs are a function of the number of trunk lines. If the communications system to be installed includes many locations or as the size of an existing system grows, the cost of the trunk lines and the associated equipment costs increase exponentially as the number of trunk lines increases.

One way of limiting the costs associated with system size, is to reduce the number of trunk lines. For example, if it is determined that the amount of traffic between PBX A 12a and PBX B 12b is small, the trunk line connecting the two locations 16e may be eliminated. This would also allow for reduced multiplexing resource 14a, 14b and PBX resource 12a, 12b at both locations. Communication between PBX A 12a and PBX B 12b would need to be routed through an alternate node connected to both. For example, a call from PBX A 12a would be sent through multiplexer 14a on the channel connected to trunk line 16a, and received by PBX C 12c. PBX C 12c would detect that the call was intended for PBX B 12b, and route the communication back out through multiplexer 14c through a PBX connection 18. The multiplexer channel chosen is one connected to trunk line 16d, which connects to the multiplexer 14b and PBX 12b at location B. This requires tandem encoding if the multiplexers 14 do not directly pass through-traffic, and in any event would cause the resource problems previously described due to the connections being static.

Figure 2:
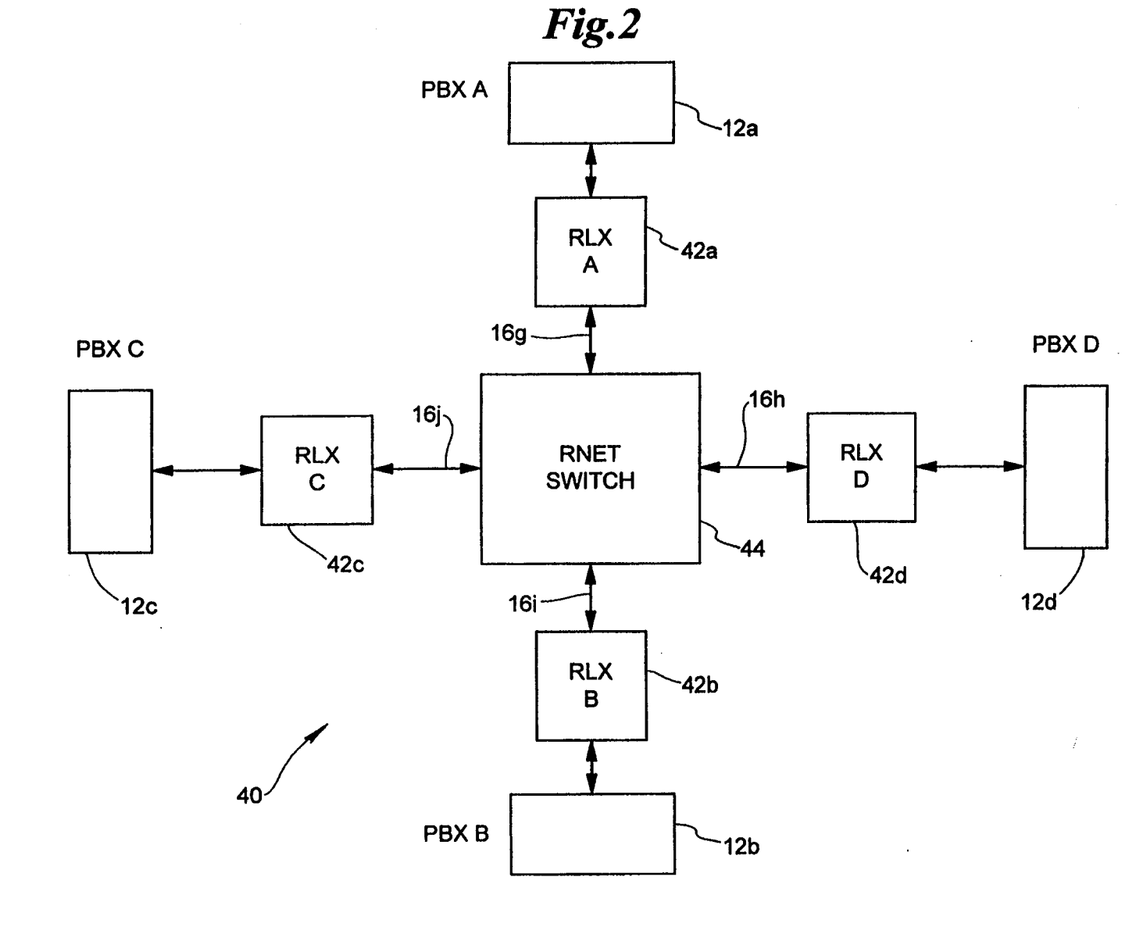
FIG. 2 shows a multiple node packet switching communications system architecture according to the present invention.

Referring now to FIG. 2, a communication system 40 according to the preferred embodiment of the present invention is shown. Each location has a standard PBX 12 for managing the internal communication system. Interface to external trunk lines is accomplished by a multiplexed digital packetizing unit (RLX) 42 located at each location. Each RLX is connected by a trunk line 16g–16j to a packet switch system 44.

In operation, communication originating at PBX A 12a, for example, is packetized by RLX 42a in a manner known in the art (see U.S. Pat. No. 4,782,485). Briefly, digital packetization of a voice signal involves digital sampling of the analog signal, compressing the data through use of speech compression algorithms, and organizing the data into a series of groups or packets. Facsimile (FAX) and computer data can also be packetized, and compressed using known data compression algorithms. Since all types of communication is packetized, the system can easily mix voice, FAX, and computer data. Within each packet is a header which contains information identifying the type of data contained within the packet. Of importance to the present invention is that each RLX 42 embeds within each packet a call number, uniquely derived as a function of the digits dialed by the originator of the communication.

After a group of data is packetized, the packet is sent to the packet switch 44 over a trunk line 16. The packet switch 44 reads from each packet the call number, and switches the packet onto a trunk line 16 according to the desired destination as indicated by the call number. The first advantage provided by this system is the fact that no more than one trunk line is required per location, since each location need only connect to a single switch 44. Thus, increases in system complexity do not result in exponential increases in trunk line and equipment costs, as is true of prior art systems.

There are other significant advantages to the system of FIG. 2 over the prior art. In addition to limiting the impact of additional nodes on the number of additional trunk lines, the number of trunk lines needed for any given number of nodes is also reduced. There is also a corresponding reduction in the number of circuits needed in the PBX and multiplexers present at each node. These advantages also lead to a reduced system administration burden, and make planning easier since the amount of trunk line resource needed depends upon the amount of communication traffic for each node, and is no longer dependant upon the traffic patterns between nodes.

Those skilled in the art will recognize that many modifications may be made to system shown on FIG. 2 without departing from the scope of the present invention. For example, the packet switch 44 would preferably be located at one of the system nodes, allowing the packet switch 44 and the RLX 20 at that location to be connected with local lines, obviating the need for the leased trunk line. In the example of FIG. 2, if the packet switch 44 was located at location A, then the connection between RLX A 20a and the packet switch 44 represented by 16g, could be inexpensive local wiring rather than a more expensive leased line.

In addition, those skilled in the art will recognize that the trunk lines are contemplated to be leased T1 lines, but could be any other communication medium such as E1 lines, a satellite link, modems connected to analog lines, leased or switched digital lines, or Integrated Services Digital Network (ISDN) lines. Further, these trunk lines can be leased in whole or in part, depending upon the amount of usage desired. Thus, references to a trunk line in the present disclosure refer equally to a portion of a trunk line or multiple trunk lines, as required by the specific application and the expected amount of traffic.

Figure 3:
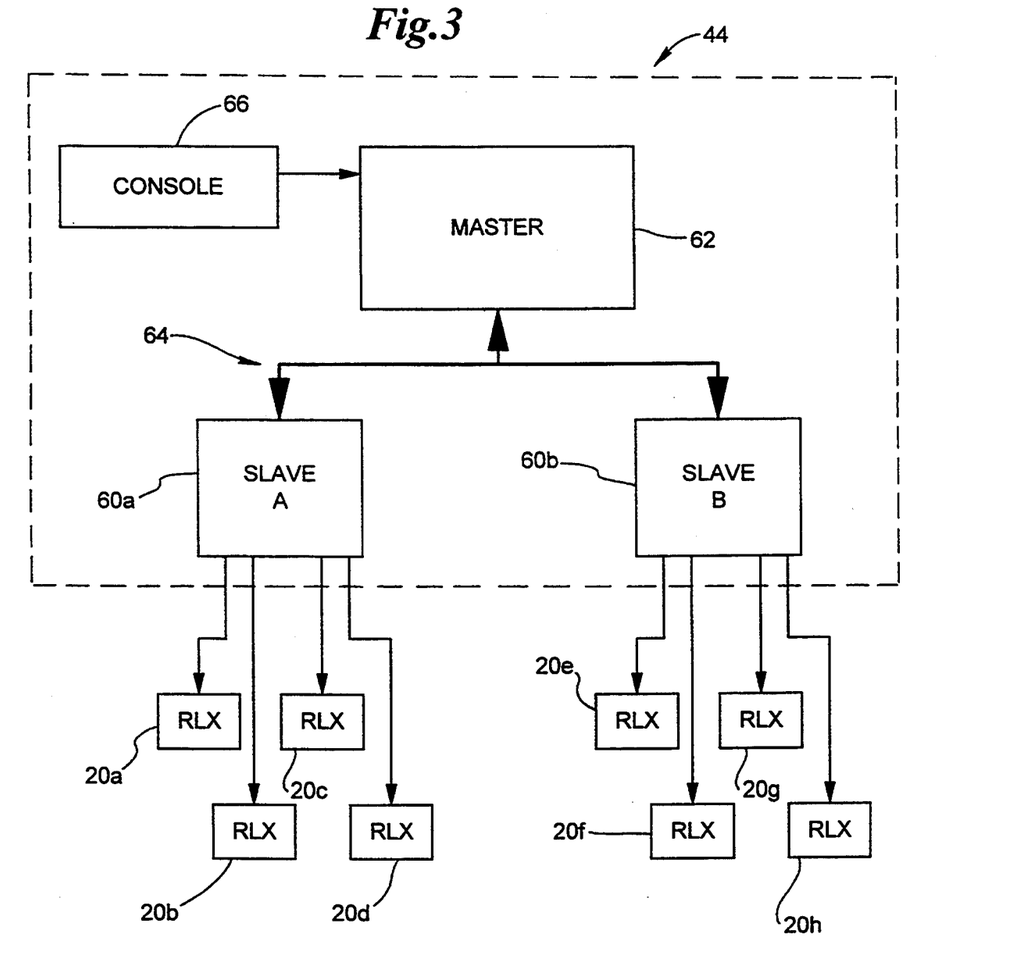
FIG. 3 shows a block diagram of the packet switching unit of FIG. 2 and its connections to multiple nodes.

Referring now to FIG. 3, a block diagram of a packet switch 44 is shown according to the preferred embodiment of the present invention. One or more slave boards 60 are connected to RLX packetizing multiplexers 20 over trunk lines 16. The slave boards 60 are connected to a master board 62 over a system bus 64 which in the preferred embodiment is an industry-standard Multi-Bus, but which may be any other appropriate bus or interface. The master board 62 controls the operation of the slave boards 60, manages connection protocol between the slave boards 60 and the multiplexers 20, and can monitor and log system operations. The entire system can be controlled and monitored from either the console 66 or from a PC 68. The console 66 is used to directly control the system, such as for installation, maintenance, or in the event that the PC 68 is inoperative or inaccessible.

The PC 68 is preferably an industry standard personal computer using an Intel 80386 microprocessor and running the UNIX operating system, although a variety of computers or workstations running various operating systems could be used. The PC 68 executes a Network Control System (NCS) program which handles a variety of activities, including downloading the packet switch's operating firmware to the master 62 and slaves 60 on power up, providing a user interface to a system administrator, logging of errors, and logging of call activity parameters such as calls made, begin time, end time, source node, destination node, digits dialed, etc. In addition, network configuration parameters are stored in the PC 68 such as routing tables, RLX parameters, and any actions to be taken based upon time of day.

In operation, communication is initiated by a telephone, FAX machine, or computer at one system node dialing a number corresponding to a party located at another system node. To establish communication, the RLX 20 at the source node first requests a connection to the packet switch 44, which begins a connection protocol exchange which will be further described in reference to FIG. 6. Once connection is established between the source RLX and the desired destination RLX, packetized information can be sent: from the source RLX to the destination RLX I 0 under the direction of the slave board 60 involved, without the need for intervention by the master board 62. If the source and destination RLXs are connected to different slave boards, packets are moved from one slave to the other by the master board 62, although those skilled in the art will recognize that it would be possible to have the slave boards 60 control packet movement directly over the system bus 64.

Figure 4:
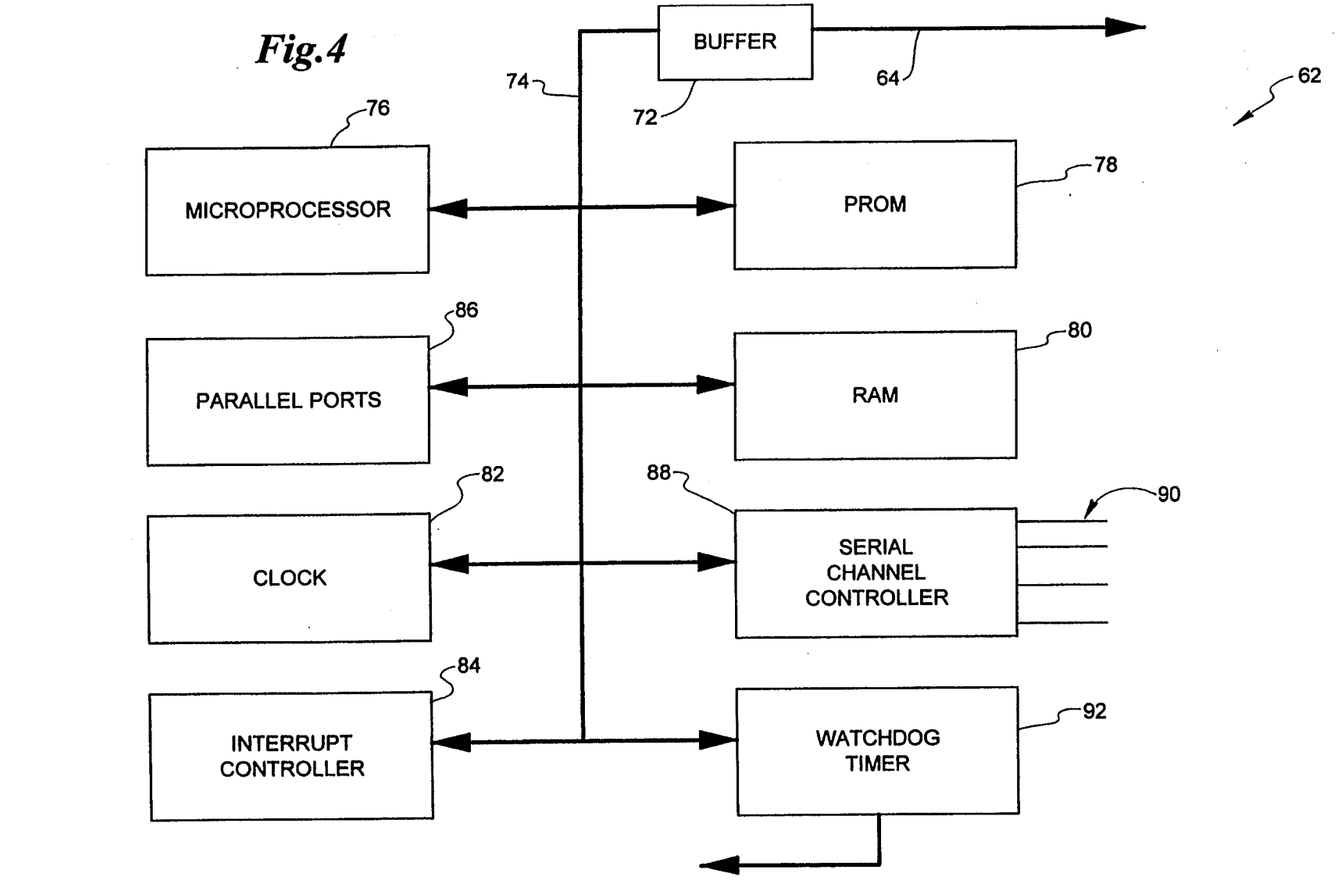
FIG. 4 shows a block diagram of the Master module of the packet switching unit of FIG. 3.

Referring now to FIG. 4, a block diagram of a master board 62 is shown. A buffer 72 isolates the system bus from the master processor bus 74. A microprocessor 76 such as an Intel 80C186 is connected over the master processor bus 74 to a variety of standard processor peripherals, including a Programmable Read Only Memory (PROM) 78, Random Access Memory (RAM) 80, a Time of Day Clock 82, and an Interrupt Controller 84. In addition, parallel ports 86 are provided for connection to parallel busses or devices as desired in any given implementation. A Serial Channel Controller 88 provides four serial ports 90 through which the master board connects to the console 66, the PC 68, and any other desired serial devices. Finally, a Watchdog Timer 92 is provided to issue a reset to the processor 76 in the event that the software malfunctions.

In the preferred embodiment, the PROM 78 contains bootstrap code which serves to download the operating firmware from the PC 68. This facilitates easier maintenance of operating firmware, in that new firmware can be installed using a floppy disk or a file transferred via modem, rather than having to replace an internal device. Those skilled in the art will recognize that many modifications can be made to the master board 62 without departing from the scope of the present invention. For example, firmware for the master board 62 could reside in EPROM, EEPROM, or any other conventionally used non-volatile storage media. In addition, one of the serial ports 90 could be connected to a data multiplexer (not shown) which, under firmware control, could split the available bandwidth of trunk lines 16 between packetized data and bit interleaved multiplex data.

Figure 5:
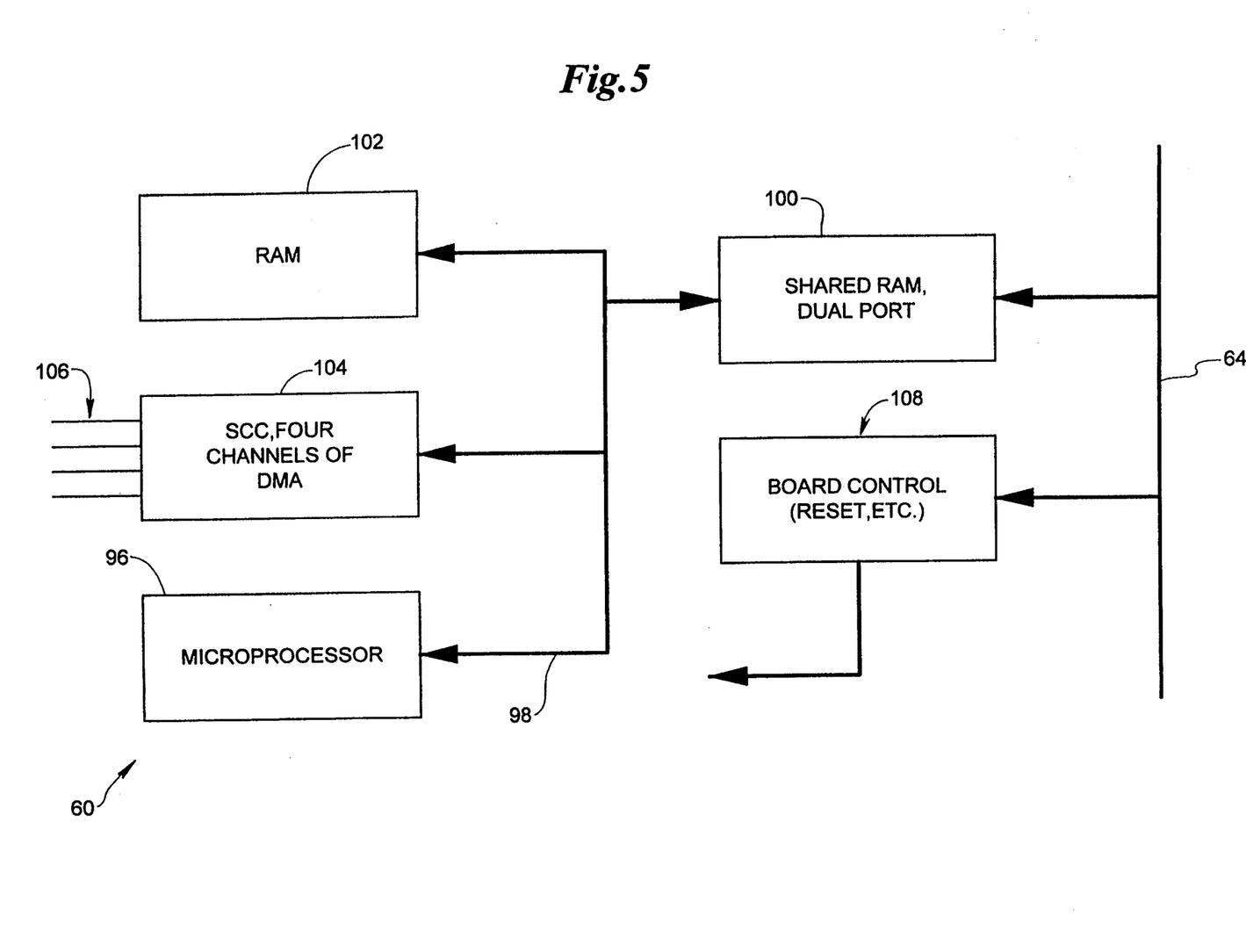
FIG. 5 shows a block diagram of a Slave module of the packet switching unit of FIG. 3.

Referring now to FIG. 5, a block diagram of a slave board 60 is shown. A slave processor 96 is connected to its peripherals via a slave processor bus 98. The interface to the master board 62 (not shown) is through a shared Dual-Port RAM 100 to the system bus 64. Commands from the master board 62 to the slave boards 60 are written in the shared RAM 100 by the master board 62, and retrieved for execution by the slave processor 96, which in the preferred embodiment is also an Intel 80C186. Firmware for the slave board processor 96 resides in the slave's local RAM 102, where it is downloaded to during the power up sequence by the master board 62, after receiving the slave firmware from the PC 68. The slave processor bus also connects to a Direct Memory Access (DMA) controller 104, which controls eight DMA channels 106, which support serial communications controllers so as to minimize microprocessor involvement in data transfer. Board control logic 108 is also provided to control typical operational aspects of the slave board 60, such as power on reset.

Figure 6:
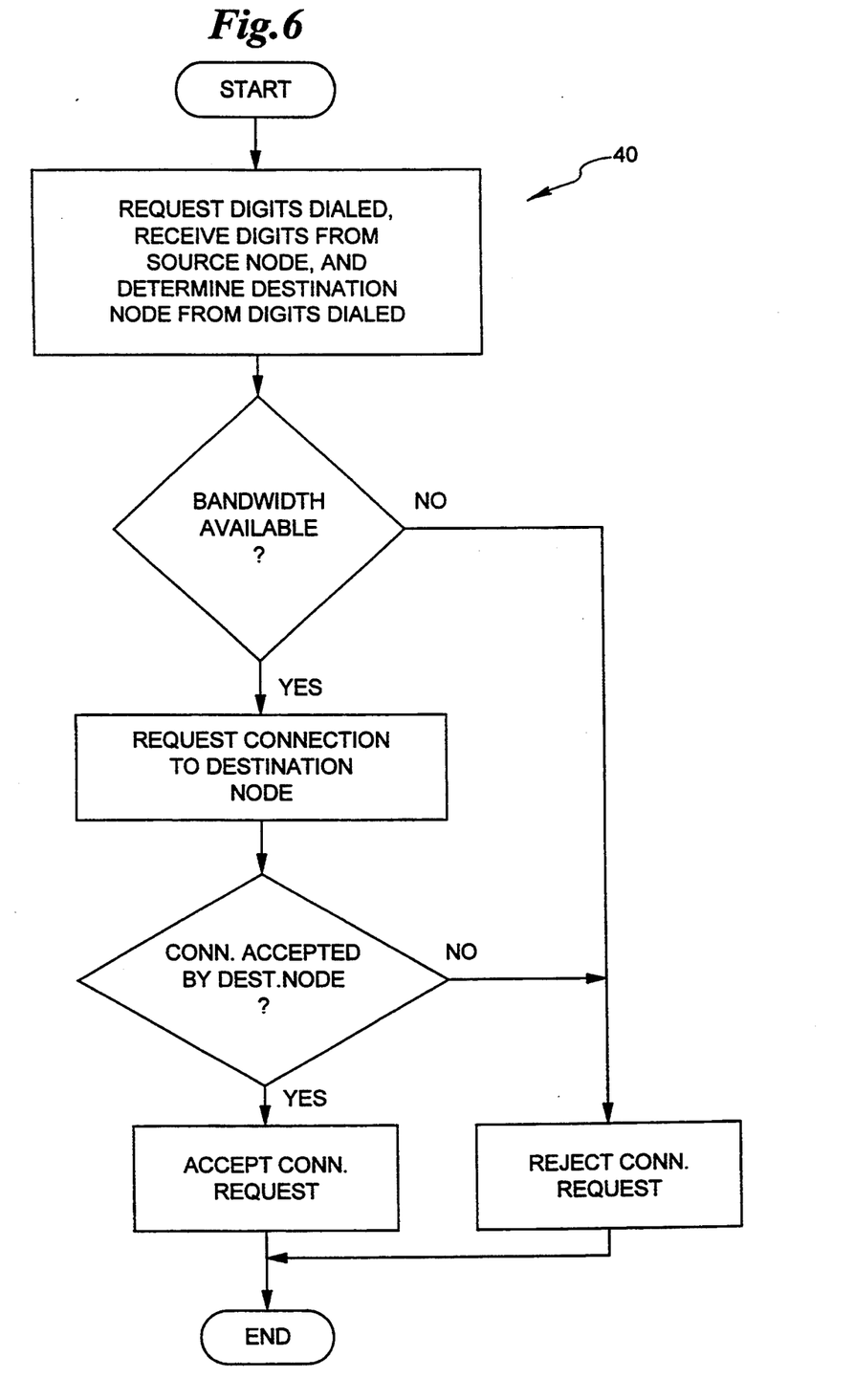
FIG. 6 shows a flow chart of the packet switch communications connection protocol of the present invention.

Referring now to FIG. 6, a flowchart of the connection protocol between the source RLX and the packet switch is shown. In order to ensure that all connections remain reliable and intelligible, there must be adequate trunk line bandwidth. If there is insufficient bandwidth, packets will be lost, resulting in reduced intelligibility of the communication. In step 120, the destination node of the attempted connection is determined from the digits dialed at the source node. Current activity is then monitored in step 122 to determine if there is sufficient bandwidth to support the connection. If there is sufficient bandwidth, a request for connection is sent to the destination node at step 124. If the request is granted at step 126, the source node is informed that the connection request has been granted at step 128. If there is insufficient bandwidth at step 122 or if the connection request is denied by the destination node at step 126, the source node will be informed that the connection request was rejected at step 130.

Figure 7:
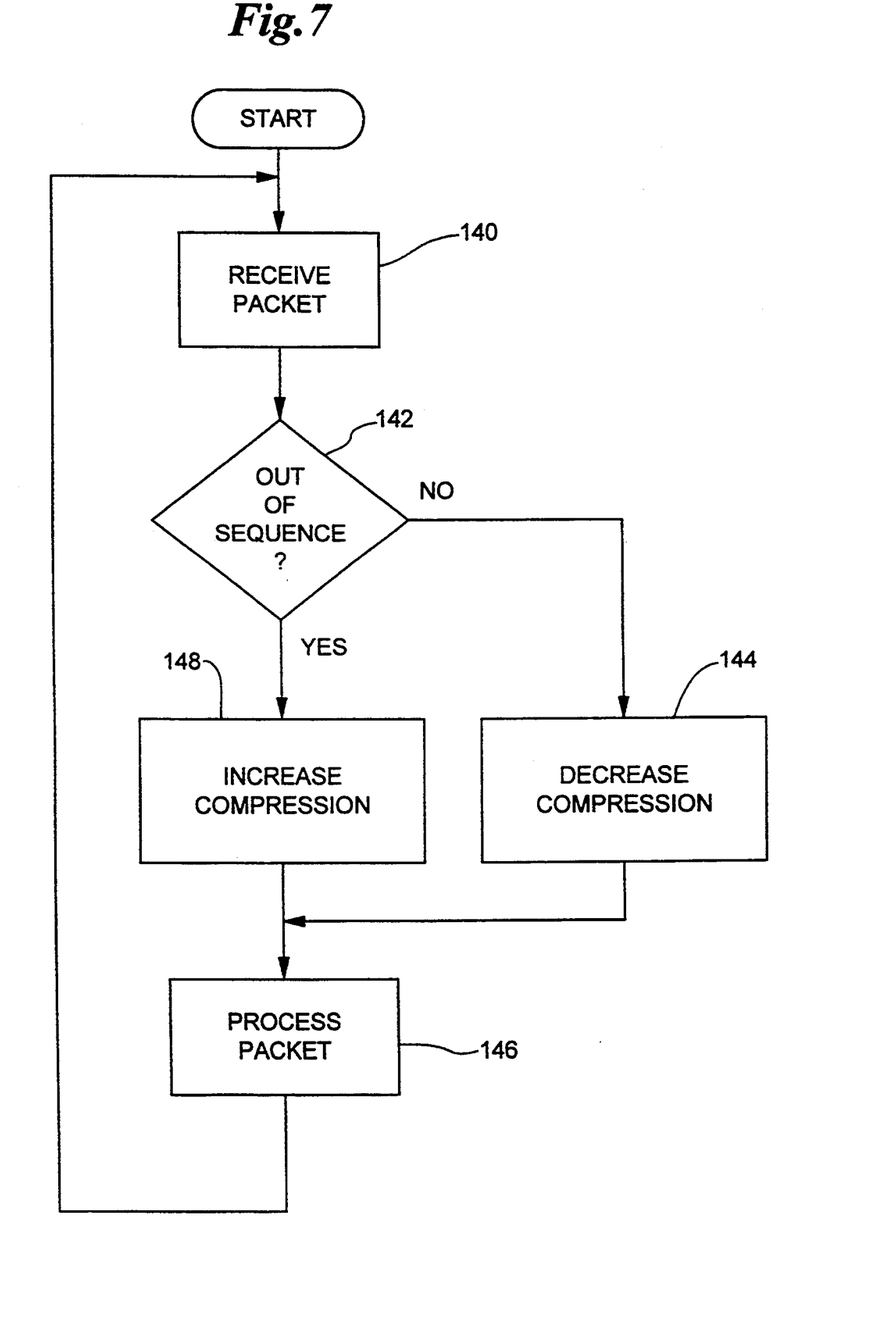
FIG. 7 shows a flow chart of packet flow control of the present invention.

Referring now to FIG. 7, a flowchart of the packet flow control according to the preferred embodiment of the present invention is shown. Flow control allows the bandwidth being used by the communications traffic to be dynamically adjusted, sacrificing voice quality when necessary and increasing voice quality when possible. The result is that the voice quality remains at or near the optimal quality possible given the available bandwidth and the current traffic.

If at any point in time, there is insufficient bandwidth to handle current traffic at a given node, outgoing voice packets will be discarded to ease the congestion. When a packet is received by the destination node at step 140, the RLX checks the sequence number embedded in the packet to see if the current packet sequentially follows the previous packet. Any gap in the sequence numbers of successive packets indicates that one or more packets were discarded as a result of an overflow condition on one of the links in the communication path. If the packet is in sequence (step 142), the destination RLX signals the source RLX to decrease the compression slightly at step 144 which increases the bandwidth being used while improving voice quality. The packet is processed in the usual manner in step 146. However, in the event that a packet is received out of sequence, (step 142), it is presumed that the bandwidth needed by the current traffic exceeds the available bandwidth. The destination RLX then signals the source RLX to increase the compression factor at step 148 which results is a reduced bandwidth requirement. Again, the packet is processed in the usual manner in step 146.

The amounts by which the compression factor of voice packets is altered depends upon many factors. What is important is that detection of an overflow must increase compression immediately and by a relatively large amount so as to eliminate the loss of packets. The decrease in compression can occur more gradually, and need not occur on every correctly sequenced packet.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. An optimizing communication system comprising:
   a plurality of nodes including a source node and a desired destination node, said source node comprising means for packetizing voice information, and said desired destination node comprising means for restoring said packetized voice information, wherein said packetized voice information uses at least some bandwidth,
   wherein said means for packetizing voice information embeds a sequence number within each packet;
   a single switching means operably connected to each of said plurality of nodes for receiving packets from said source node and switching said packets to said desired destination node;
   means for dynamically adjusting said at least some bandwidth used by said packetized voice information during periods of high packet discards by increasing compression of said packetized voice information when a gap in the sequence number is detected at the destination node; and
   means for dynamically adjusting said at least some bandwidth used by said packetized voice information during periods of low traffic by decreasing compression of said packetized voice information.

2. The system of claim 1, wherein said packetized information is voice information.

3. The system of claim 1, wherein said source node comprises means for discarding a packet if there is insufficient bandwidth to send it.

4. A method of switching packetized information, comprising the steps of:
- embedding destination information within a header portion of a voice information packet;
- embedding a sequence number within each packet;
- selecting a destination node for the voice information packet based upon the destination information contained in the packet header;
- switching the voice information packet to the selected destination node by a single switch;
- dynamically adjusting said at least some bandwidth used by said packetized information during periods of high packet discards by increasing compression of said packetized information when a gap in the sequence number is detected at the destination node; and
- dynamically adjusting said at least some bandwidth used by said packetized information during periods of low traffic by decreasing compression of said packetized information.

5. The method of claim 4, wherein said packetized information is voice information.

6. The method of claim 4, further comprising the step of:
- at the source node, discarding a packet if there is insufficient bandwidth to send it.

7. A method of controlling packet flow in a packetized communication system having a source node, a destination node, and a single switch wherein packets contain compressed information, the method comprising the steps of:
- embedding a unique sequence number within each of a plurality of packets being sent from the source node, through said single switch, and received at the destination node;
- at the destination node, determining from the sequence numbers contained in the packets received if any packets have been discarded; and
- increasing compression at the source node if there is a gap in the sequence number at the destination node.

8. A method according to claim 7, wherein compression is increased by an amount sufficient to prevent the discarding of packets.

9. A method according to claims 7 or 8, further comprising the step of decreasing compression by an incremental amount at the source node if packets are being received in correct sequence.

10. The method of claim 7, further comprising the step of:
- at the source node, discarding a packet if there is insufficient bandwidth to send it.

* * * * *